US012531370B2

(12) United States Patent
He

(10) Patent No.: US 12,531,370 B2
(45) Date of Patent: Jan. 20, 2026

(54) FAST PLUG-IN ENERGY STORAGE CONNECTOR

(71) Applicant: Dongguan City Jianghan Electronics Co.,Ltd, Dongguan (CN)

(72) Inventor: Tiejun He, Dongguan (CN)

(73) Assignee: Dongguan City Jianghan Electronics Co., Ltd, Dongguan (CN)

( * ) Notice: Subject to any disclaimer, the term of this patent is extended or adjusted under 35 U.S.C. 154(b) by 316 days.

(21) Appl. No.: 18/374,201

(22) Filed: Sep. 28, 2023

(65) Prior Publication Data

US 2025/0055222 A1 Feb. 13, 2025

(30) Foreign Application Priority Data

Aug. 11, 2023 (CN) ......................... 202311016623.3

(51) Int. Cl.
*H01R 13/627* (2006.01)
*H01R 13/52* (2006.01)
*H01R 13/53* (2006.01)
*H01R 13/639* (2006.01)

(52) U.S. Cl.
CPC ....... *H01R 13/6275* (2013.01); *H01R 13/639* (2013.01); *H01R 13/5202* (2013.01); *H01R 13/53* (2013.01)

(58) Field of Classification Search
CPC ...... H01R 13/52; H01R 13/53; H01R 13/502; H01R 13/6275; H01R 13/639; H01R 13/6273
See application file for complete search history.

(56) References Cited

U.S. PATENT DOCUMENTS

| | | | | |
|---|---|---|---|---|
| 4,863,201 A * | 9/1989 | Carstens | F16L 37/42 285/308 |
| 7,597,577 B1 * | 10/2009 | Huang | H01R 13/635 439/354 |
| 2019/0190200 A1 * | 6/2019 | Chang | H01R 13/6593 |
| 2022/0231458 A1 * | 7/2022 | Chang | H01R 24/40 |
| 2022/0336997 A1 | 10/2022 | Guo | |
| 2024/0396262 A1 * | 11/2024 | Mauney | H01R 13/6275 |

FOREIGN PATENT DOCUMENTS

| | | |
|---|---|---|
| CN | 208986289 U | 6/2019 |
| CN | 115566461 U | 1/2023 |
| CN | 116031711 A | 4/2023 |

* cited by examiner

*Primary Examiner* — Oscar C Jimenez
(74) *Attorney, Agent, or Firm* — Birchwood IP

(57) ABSTRACT

Provided is a fast plug-in energy storage connector, including a plug assembly and a socket assembly, where the socket assembly includes a housing body and a male terminal; the plug assembly includes a plug body, a tail lid, a button structure, a two-way buckle and a conductive terminal, and the two-way buckle includes a first buckle arm, a second buckle arm and a connecting member that are clamped with the housing body in respective; the button structure includes a button brake block, a link, a reset spring and locking members; and lower ends of the locking members are provided with lean-against portions that are in contact with and leaning against the first buckle arm and the second buckle arm in respective. The fast plug-in energy storage connector is convenient for users to operate and has a long service life.

20 Claims, 11 Drawing Sheets

FAST PLUG-IN ENERGY STORAGE CONNECTOR

CROSS-REFERENCE TO RELATED APPLICATIONS

This application claims the benefit and priority of Chinese patent application No. 202311016623.3, filed on Aug. 11, 2023, disclosure of which is hereby incorporated by reference in its entirety.

TECHNICAL FIELD

The present disclosure relates to the technical field of electrical connectors, and in particular to a fast plug-in energy storage connector.

BACKGROUND

An electrical connector can achieve the electrical conduction between two independent electrical structures. As one of the common electrical connectors, an energy storage connector is used to connect an energy storage system (such as a battery) and other electrical apparatuses, and widely applied in fields such as an electric vehicle, a solar and wind energy system and a grid energy storage system.

The existing energy storage connector generally includes a plug assembly and a socket assembly, and an electrical connection may be achieved after the plug assembly is plugged with the socket assembly. In order to avoid a loosening or falling phenomenon occurred to the energy storage connector during use, a locking structure used for locking the plug assembly and the socket assembly is generally arranged in the energy storage connector, and limiting, fixing and unlocking operations can be achieved through the cooperative use of a button and the locking structure. However, the existing locking structure is generally in single-buckle connection with the button, and when the button is unevenly stressed, a phenomenon of being stuck and not bouncing back will occur to a product, which is not convenient for users to operate and use, and also affects the using experience of the users.

The foregoing defects are expected to be overcome by those skilled in the art.

SUMMARY

To overcome the foregoing defects in the prior art, the present disclosure provides a fast plug-in energy storage connector, which is convenient for users to use and operate and has a long service life.

In order to solve the foregoing objective, the present disclosure adopts the technical solution below:

A fast plug-in energy storage connector, including a plug assembly and a socket assembly in plug-unplug connection with the plug assembly, where the socket assembly includes a housing body and a male terminal installed inside the housing body; the plug assembly includes a plug body in plug-unplug connection with the housing body, a tail lid detachably connected to the plug body, a button structure movably installed on the plug body, a two-way buckle installed in the plug body and a conductive terminal installed in the plug body and in plug-unplug connection with the male terminal, and the two-way buckle includes a first buckle arm clamped with the housing body, a second buckle arm clamped with the housing body and arranged symmetrically with the first buckle arm, and a connecting member for connecting the first buckle arm to the second buckle arm; the button structure includes a button brake block movably installed on the plug body, a link installed at a bottom of the button brake block, a reset spring sleeved on the link and locking members installed on both sides of the bottom of the button brake block in respective; and lower ends of the locking members are provided with lean-against portions that are in contact with and leaning against the first buckle arm and the second buckle arm in respective.

By arranging the lean-against portions, with cross sectional areas decreasing gradually from top to bottom and in contact with and leaning against the first buckle arm and the second buckle arm at the lower ends of the locking members, the plug assembly and the socket assembly can be subjected to limiting, fixing and unlocking operations under the cooperation of the housing body, the first buckle arm, the second buckle arm, the button brake block, the link, the reset spring, the locking members and the lean-against portions, with simple plugging and use; and meanwhile a risk caused by uneven stress of the button brake block that the button brake block is stuck and does not bounce back is also reduced, which is convenient for an operator to use.

Further, the plug assembly further includes a contact cylinder installed in the conductive terminal and in plug-unplug connection with the male terminal; the contact cylinder is arranged in a hollow and cylindrical manner, a plurality of first cutting holes are formed in the contact cylinder, and mounting sheets are arranged in the first cutting holes; one end that each mounting sheet is close to an opening of the conductive terminal is provided with a second cutting hole, and a dome is installed in the second cutting hole; and at least one reinforcing member for connecting the mounting sheets to the first cutting holes is also installed in the first cutting holes. When being plugged with the contact cylinder, the male terminal is in elastic contact with the dome first, and then in rigid contact with the mounting sheets, which is conducive to improving a positive force when the male terminal is plugged into the contact cylinder, thereby reducing a contact resistance.

Further, the housing body of the socket assembly includes a base, a docking portion installed on one side that the base is close to the plug assembly and connected to the plug assembly, a fixing portion installed on one side that the base is away from the plug assembly, and a snap ring portion installed at one end that the docking portion is close to the plug assembly; one end that the snap ring portion is close to the base is provided with an annular clamping slot; and the first buckle arm and the second buckle arm are clamped with the annular clamping slot in respective.

Preferably, the first buckle arm and the second buckle arm are integrally formed with the connecting member. The annular clamping slot is arranged such that the first buckle arm and the second buckle arm are clamped with the annular clamping slot in respective, making the plug assembly achieve 180° of rotation and meet different assembly demands of users, with a strong practicability.

Preferably, the plug body of the plug assembly includes a main body portion provided with a mounting cavity for plugging the docking portion, a plug upper lid covered at a top of the main body portion, a plugging portion installed in the mounting cavity and in plug-unplug connection with the docking portion, and a threaded connection portion installed at a bottom of the main body portion; an upper end of an inner wall of the tail lid is provided with internal threads, and the threaded connection portion is in threaded connection with the internal threads; both sides of an inner wall of the mounting cavity are provided with a first clamping hole and a second clamping hole, respectively; the first buckle arm and the second buckle ar are installed on the main body portion in respective through the first clamping hole and the second clamping hole; and one end of the conductive terminal is installed in the plugging portion while the other end passes through the threaded connection portion and extends into the tail lid. By arranging the threaded connection portion, which is in threaded connection with the internal threads at the upper end of the inner wall of the tail lid, the connecting fastness between the plug body and the tail lid can be ensured, which is also convenient for quick installation and disassembly of the operator.

Preferably, a fixing slot is formed in a top of the main body portion, and an accommodating cavity is formed in a bottom of the fixing slot; a mounting hole corresponding to the fixing slot is formed in the plug upper lid; and the button structure is installed in the fixing slot through the mounting hole, the link of the button structure is slidingly installed in the accommodating cavity, and one end of the reset spring of the button structure is propped to the bottom of the button brake block while the other end is propped to the bottom of the fixing slot.

Preferably, a first sealing ring for waterproofing is sleeved at one end that the threaded connection portion is close to the main body portion.

Preferably, a first chamber, and a second chamber in which an external cable is plugged are sequentially arranged inside the tail lid from top to bottom; the first chamber communicates with the second chamber mutually, and an inner diameter of the second chamber is less than that of the first chamber; and the internal threads are arranged at an upper end of an inner wall of the first chamber.

The plug assembly further includes a sealing sleeve installed in the tail lid, and a lower end of the sealing sleeve is clamped in the second chamber; and the conductive terminal includes a first conductive portion installed in the plugging portion and in plug-unplug connection with the male terminal, a second conductive portion passing through the threaded connection portion and plugged in the sealing sleeve, and a first connecting portion for connecting the first conductive portion to the second conductive portion.

Preferably, the first conductive portion and the second conductive portion are integrally formed with the first connecting portion, which is conductive to reducing the contact resistance, thereby reducing the generation of heat during use and reducing the temperature when the fast plug-in energy storage connector is used.

Preferably, the plug assembly further includes a tightening jacket installed in the tail lid, and the tightening jacket is sleeved outside the sealing sleeve and installed in the first chamber; and the tightening jacket includes a plugging portion in which the sealing sleeve is plugged, and a tightening portion arranged at one end that the plugging portion is close to the second chamber and used for tightening the sealing sleeve. Preferably, the tightening portion is composed of a plurality of tightening members arranged at an edge of one end that the plugging portion is close to the second chamber. The tightening of the sealing sleeve is achieved in a manner that the tightening jacket is arranged in the first chamber of the tail lid and sleeved outside the sealing sleeve, such that the sealing sleeve is stably installed in the tail lid.

Preferably, a mounting slot is formed in the plugging portion, a second sealing ring for waterproofing is sleeved on the mounting slot, and the operator is convenient to sleeve the second sealing ring on the plugging portion for easy installation.

Preferably, a plurality of anti-skid raised lines are arranged on an upper surface of the plug upper lid.

Preferably, an upper surface of the button brake block is also provided with a plurality of raised button lines.

Preferably, the socket assembly further includes an anti-contact member installed at one end that the male terminal is close to the plug assembly.

Preferably, the socket assembly further includes a sealing gasket sleeved on one side that the base is close to the fixing portion; a plurality of first assembly holes are formed in the base, and a plurality of second assembly holes corresponding to the first assembly holes one by one are formed in the sealing gasket; and the sealing gasket adopts a fastener to be tightly connected to the base through the first assembly holes and the second assembly holes.

Preferably, one end that the snap ring portion is away from the annular clamping slot is provided with a guide cambered surface coaxially arranged with the snap ring portion. Arranging the guide cambered surface facilitates the plug-unplug connecting operation for the socket assembly and the plug assembly.

Preferably, the first cutting holes are uniformly formed in a circumferential direction of the contact cylinder.

Preferably, the first cutting holes, the mounting sheets and the reinforcing members are integrally formed, and the second cutting holes and the dome are integrally formed.

Preferably, the contact cylinder is formed by winding; and a notch is formed in the contact cylinder and arranged along an axis direction of the contact cylinder, such that the contact cylinder has a certain of elastic deformation quantity in a circumferential direction thereof. Meanwhile, the contact cylinder is also convenient to process, and after being punched, a coiled material is wound and made into the contact cylinder, so the manufacturing process is simplified.

Compared with the prior art, the present disclosure has the following beneficial effects:

1. According to the fast plug-in energy storage connector in the present disclosure, the button structure is provided and movably installed on the plug body, the two-way buckle is installed in the plug body, the two-way buckle includes the first buckle arm, the second buckle arm and the connecting member for connecting the first buckle arm to the second buckle arm, and the first buckle arm and the second buckle arm are clamped with the housing body in respective; the button structure includes the button brake block, the link, the reset spring and the locking members, the lower ends of the locking members are provided with the lean-against portions that have the cross sectional areas decreasing gradually from top to bottom and are in contact with and leaning against the first buckle arm and the second buckle arm; when being pressed, the button brake block drives the locking members to move down, the lean-against portions move down and are separated from the first buckle arm and the second buckle arm in order to complete the unlocking operation and reduce the force required by the operator to disassemble and separate the socket assembly and the plug assembly; and when loosening the button brake block, the reset spring drives the button brake block to move up and reset, the button brake block drives the locking members to move up, the lean-against portions move up and are in contact with and leaning against the first buckle arm and the second buckle arm in respective in order to complete the limiting and fixation of the plug assembly and the socket assembly, and with simple plugging and use, the fast plug-in energy storage connector is convenient for the operator to use.

2. By arranging the first buckle arm and the second buckle arm symmetrically, the lean-against portions are in contact with and leaning against with the first buckle arm and the second buckle arm in respective, so as to reduce the risk caused by uneven stress of the button brake block that the button brake block is stuck and does not bounce back, which is convenient for the operator to use, with a long service life.

3. The manner that the conductive terminal is provided and includes the first conductive portion, the second conductive portion and the first connecting portion, and the first conductive portion, the second conductive portion and the first connecting portion are integrally formed is conductive to reducing the contact resistance, reducing the generation of heat during use and reducing the short-circuit risk caused by the temperature rise when the fast plug-in energy storage connector is used, and the fast plug-in energy storage connector has excellent safety performance.

4. The contact cylinder is in plug-unplug connection with the male terminal by arranging and installing the contact cylinder in the conductive terminal; and the manner that the plurality of first cutting holes are formed in the contact cylinder, the mounting sheets are arranged in the first cutting holes, one end that each mounting sheet is close to the opening of the conductive terminal is provided with the second cutting hole, the dome is installed in the second cutting hole, at least one reinforcing member is installed in the first cutting holes to connect the mounting sheets to the first cutting holes such that the male terminal is in elastic contact with the dome first and then in rigid contact with the mounting sheets when in plug-unplug connection with the contact cylinder is conductive to improving the positive force when the male terminal is plugged into the contact cylinder and reducing the contact resistance, and the fast plug-in energy storage connector has good contact performance.

BRIEF DESCRIPTION OF DRAWINGS

FIG. 1I is a structure diagram of a contact cylinder in a fast plug-in energy storage connector provided by the present disclosure.

Reference signs: 1. Plug assembly, 11. Plug body, 112. Main body portion, 1121. Mounting cavity, 1122. Fixing slot, 113. Plug upper lid, 1131. Mounting hole, 1132, Anti-skid raised line, 114. Plugging portion, 1141. Mounting slot, 115. Threaded connection portion, 116. First sealing ring, 117. Second sealing ring, 12. Tail lid, 121. First chamber, 1211. Internal thread, 122. Second chamber, 13, Button structure, 131. Button brake block, 1311. Raised button line, 132. Link, 133. Reset spring, 134. Locking member, 1341. Lean-against portion, 14. Two-way buckle, 141. First buckle arm, 142. Second buckle arm, 143. Connecting member, 15. Conductive terminal, 151. First conductive portion, 152. Second conductive portion, 153. First connecting portion, 16. Contact cylinder, 161. First cutting hole, 162. Mounting sheet, 163. Second cutting hole, 164. Dome, 165. Reinforcing member, 166. Notch, 17. Sealing sleeve, 18. Tightening jacket, 181. Plugging portion, 182. Tightening portion, 2. Socket assembly, 21. Housing body, 211. Base, 212. Docking portion, 213. Fixing portion, 214. Snap ring portion, 2141. Annular clamping slot, 2142. Guide cambered surface, 22. Male terminal, 23. Anti-contact member, 24. Sealing gasket.

DETAILED DESCRIPTION

In order to make the objectives, technical solution and advantages of the present disclosure clearer, the technical solutions in the embodiments of the present disclosure are clearly and completely elaborated below in combination with the drawings. It is apparent that the described embodiments are a part of the embodiments of the present disclosure but not all. Based on the embodiments of the present disclosure, all the other embodiments obtained by those of ordinary skill in the art on the premise of not contributing creative effort should belong to the protection scope of the present disclosure.

Figure 1:
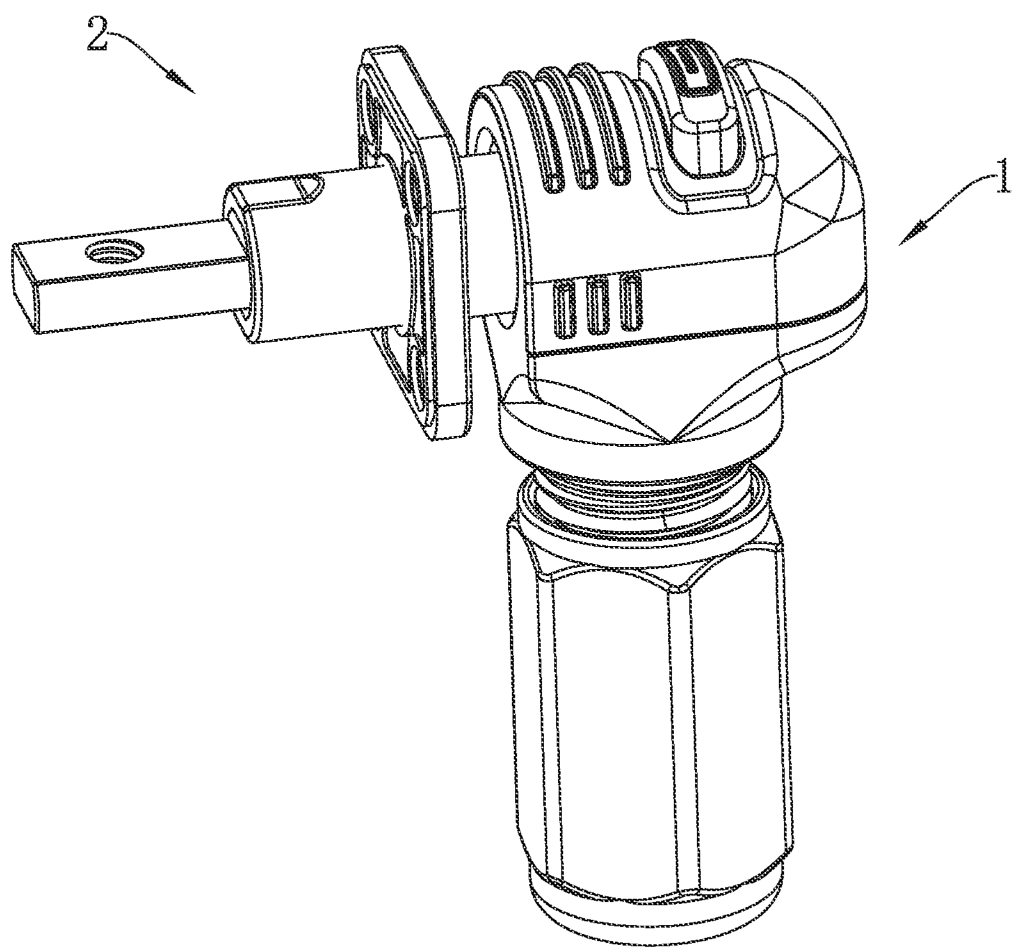
FIG. 1 is a diagram of an overall structure of a fast plug-in energy storage connector provided by the present disclosure.

Please refer to FIG. 1, which is a diagram of an overall structure of a fast plug-in energy storage connector provided by the present disclosure. A fast plug-in energy storage connector includes a plug assembly 1 and a socket assembly 2 which are arranged relatively to each other, and the socket assembly 2 is in plug-unplug connection with the plug assembly 1.

Figure 2:
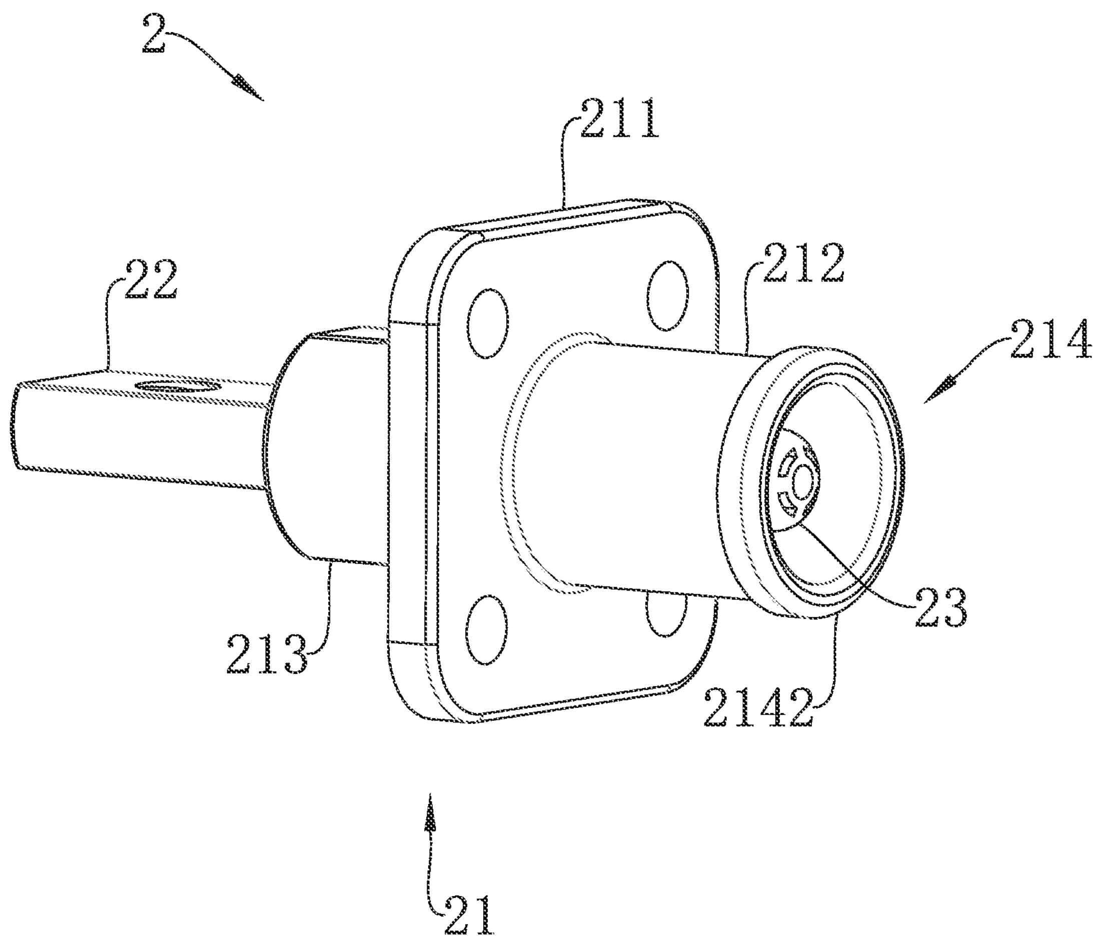
FIG. 2 is a structure diagram of a socket assembly in a fast plug-in energy storage connector provided by the present disclosure.
Figure 3:
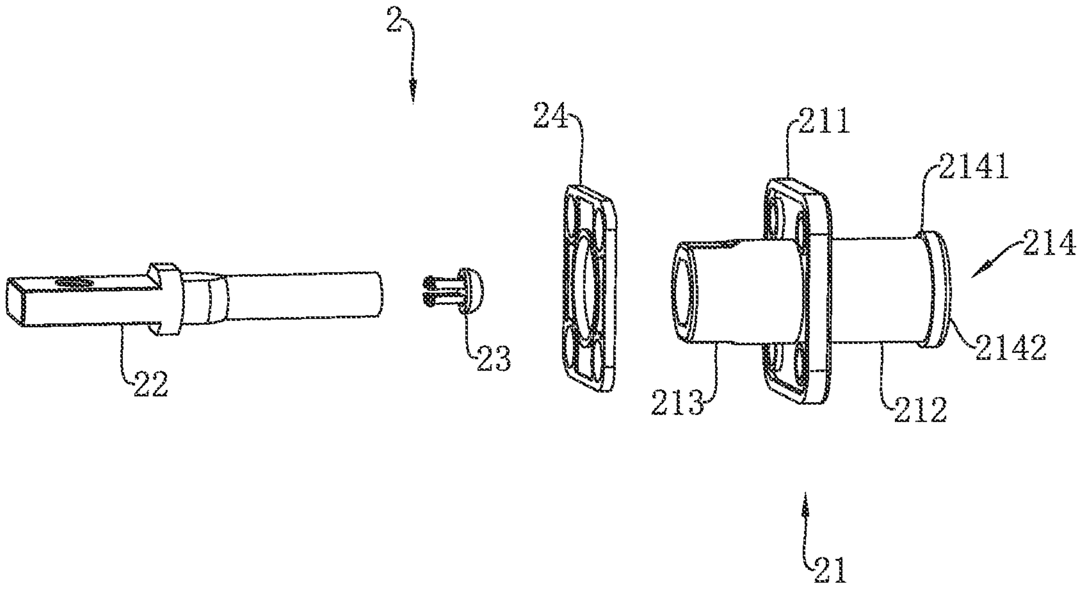
FIG. 3 is an exploded diagram of a socket assembly in a fast plug-in energy storage connector provided by the present disclosure.

Please refer to FIG. 2 and FIG. 3 together, the socket assembly 2 includes a housing body 21, a male terminal 22, an anti-contact member 23 and a sealing gasket 24. The male terminal 22 is installed inside the housing body 21, and in this embodiment, the male terminal 22 is a copper alloy member. The anti-contact member 23 is installed at one end that the male terminal 22 is close to the plug assembly 1, and in this embodiment, the anti-contact member 23 is a plastic member. The housing body 21 includes a base 211, a docking portion 212, a fixing portion 213 and a snap ring portion 214, and a plurality of first assembly holes are formed in the base 211.

The docking portion 212 is arranged in a hollow and tubular structure, and the docking portion 212 is installed on one side that the base 211 is close to the plug assembly 1 and connected to the plug assembly 1. The fixing portion 213 is installed on one side that the base 211 is away from the plug assembly 1, and the snap ring portion 214 is installed at one end that the docking portion 212 is close to the plug assembly 1. Specifically, an annular clamping slot 2141 is arranged at one end that the snap ring portion 214 is close to the base 211, a guide cambered surface 2142 is arranged at one end that the snap ring portion 214 is away from the annular clamping slot 2141, and the guide cambered surface 2142 and the snap ring portion 214 are coaxially arranged, which facilitates the plug-unplug connecting operation for the socket assembly 2 and the plug assembly 1. In this embodiment, the base 211, the docking portion 212, the fixing portion 213 and the snap ring portion 214 are integrally formed and all plastic members.

The sealing gasket 24 is sleeved on one side that the base 211 is close to the fixing portion 213, a plurality of second assembly holes are formed in the sealing gasket 24 and correspond to first assembly holes in the base 211 one by one. The sealing gasket 24 adopts a fastener to be tightly connected to the base 211 through the first assembly holes and the second assembly holes. In this embodiment, the sealing gasket 24 is a silicone gasket for waterproofing.

Figure 4:
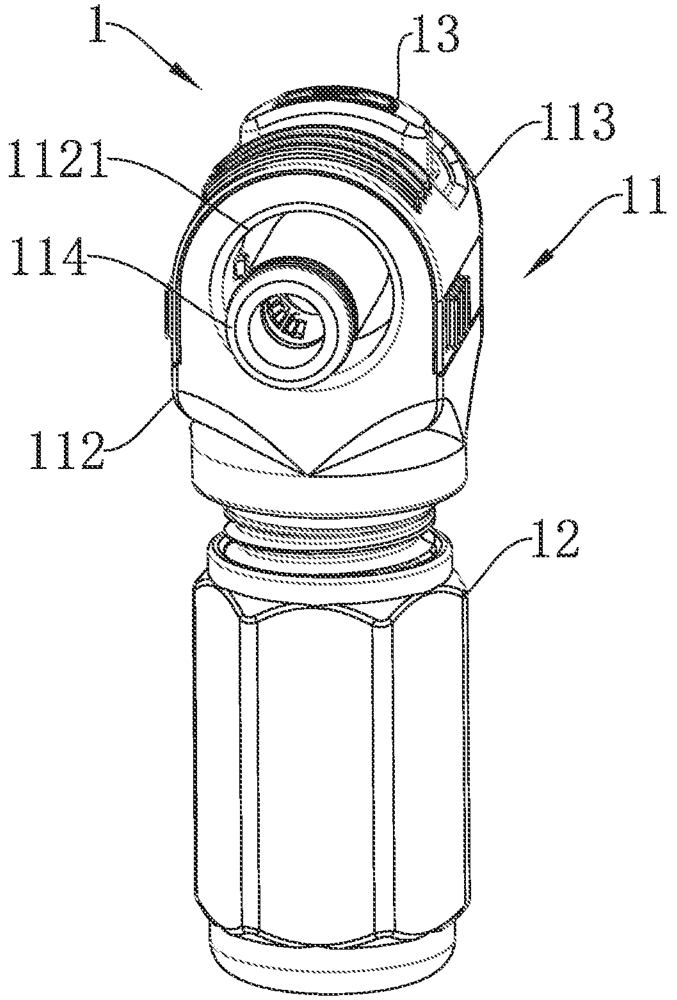
FIG. 4 is a structure diagram of a plug assembly in a fast plug-in energy storage connector provided by the present disclosure.
Figure 5:
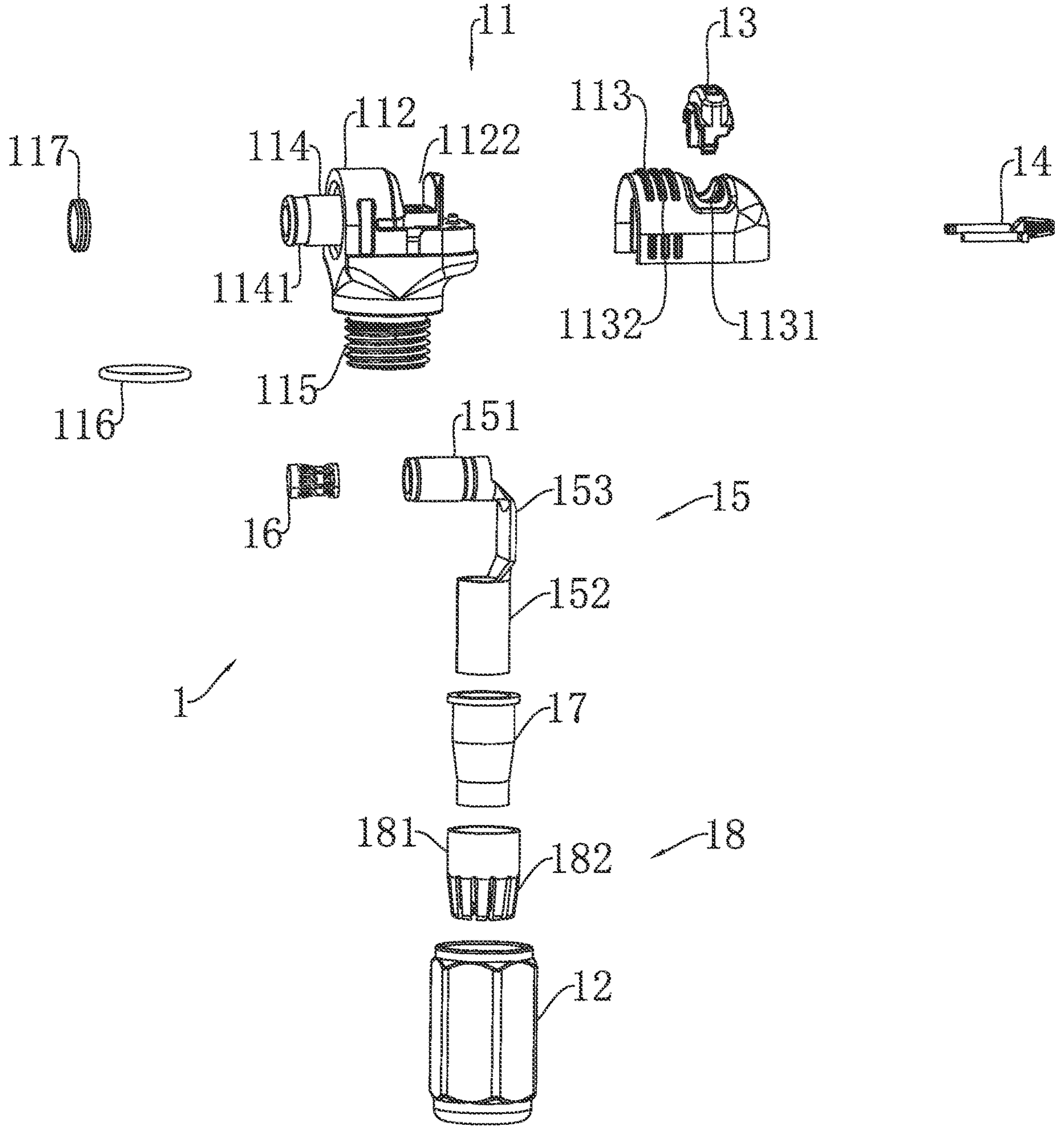
FIG. 5 is an exploded diagram of a plug assembly in a fast plug-in energy storage connector provided by the present disclosure.

Please refer to FIG. 4 and FIG. 5 together, the plug assembly 1 includes a plug body 11, a tail lid 12, a button structure 13, a two-way buckle 14, a conductive terminal 15, a contact cylinder 16, a sealing sleeve 17 and a tightening jacket 18. The plug body 11 is in plug-unplug connection with the housing body 21, and the tail lid 12 is detachably connected to the plug body 11. The button structure 13 is movably installed on the plug body 11, the two-way buckle 14 is installed inside the plug body 11, and the conductive terminal 15 is installed in the plug body 11 and in plug-unplug connection with a male terminal 22. The contact cylinder 16 is installed in the conductive terminal 15 and in plug-unplug connection with the male terminal 22. The sealing sleeve 17 is installed in the tail lid 12, and the tightening jacket 18 is installed in the tail lid 12 and sleeved outside the sealing sleeve 17.

Specifically speaking, the plug body 11 includes a main body portion 112, a plug upper lid 113, a plugging portion 114, a threaded connection portion 115, a first sealing ring 116 and a second sealing ring 117. A mounting cavity 1121 is arranged on the main body portion 112 and located on one side that the main body portion 112 is close to the socket assembly 2, so that the docking portion 212 of the socket assembly 2 is plugged. The plugging portion 114 is arranged in a hollow and tubular structure and installed in the mounting cavity 1121. An outer diameter of the plugging portion 114 is equal to an inner diameter of the docking portion 212, and the plugging portion 114 is in plug-unplug connection with the docking portion 212. A mounting slot 1141 is formed in the plugging portion 114, and the second sealing ring 117 is sleeved on the mounting slot 1141 for waterproofing, with an convenient operation. The threaded connection portion 115 is installed at a bottom of the main body portion 112 and arranged in a hollow and tubular structure, and an outer surface of the threaded connection portion 115 is provided with a plurality of external threads. The first sealing ring 116 is sleeved at one end that the threaded connection portion 115 is close to the main body portion 112 for waterproofing. The main body portion 112, the plugging portion 114 and the threaded connection portion 115 are integrally formed, which facilitates the assembly of the fast plug-in energy storage connector. In this embodiment, the main body portion 112, the plugging portion 114 and the threaded connection portion 115 are all plastic members.

A fixing slot 1122 is formed in a top of the main body portion 112, and an accommodating cavity is formed in a bottom of the fixing slot 1122. The plug upper lid 113 is covered at the top of the main body portion 112, a mounting hole 1131 is formed in the plug upper lid 113, and the mounting hole 1131 corresponds to the fixing slot 1122. An outer surface of the plug upper lid 113 is also provided with a plurality of anti-skid raised lines 1132, through which the operator can hold easily for installation and operation.

Figure 7:
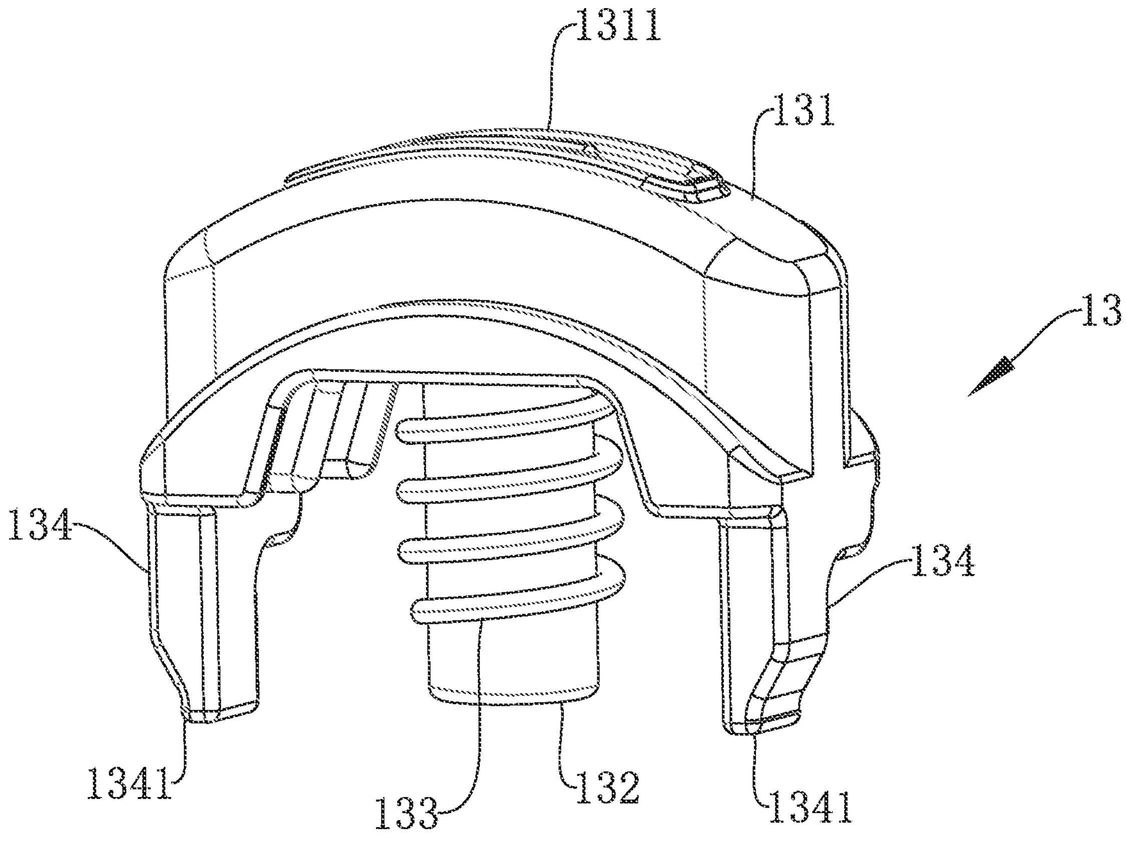
FIG. 7 is a structure diagram of a button structure in a fast plug-in energy storage connector provided by the present disclosure.

Please refer to FIG. 7 together, the button structure 13 includes a button brake block 131, a link 132, a reset spring 133 and two locking members 134. The button brake block 131 is movably installed on the plug body 11, the link 132 is installed at a bottom of the button brake block 131, the reset spring 133 is sleeved on the link 132, the locking members 134 are installed on both sides of the bottom of the button brake block 131 in respective, and lower ends of the locking members 134 are provided with lean-against portions 1341, which have cross sectional areas decreasing gradually from top to bottom. The button structure 13 is installed in the fixing slot 1122 of the main body portion 112 through the mounting hole 1131 in the plug upper lid 113. Specifically, the link 132 of the button structure 13 is slidingly installed in the accommodating cavity, and one end of the reset spring 133 of the button structure 13 is propped to the bottom of the button brake block 131 while the other end is propped to the bottom of the fixing slot 1122. Preferably, an upper surface of the button brake block 131 is also provided with a plurality of raised button lines 1311, and even an operation environment has insufficient light, the operator can identify the button structure 13 quickly through the raised button lines 1311 for performing installation and operation smoothly.

Figure 8:
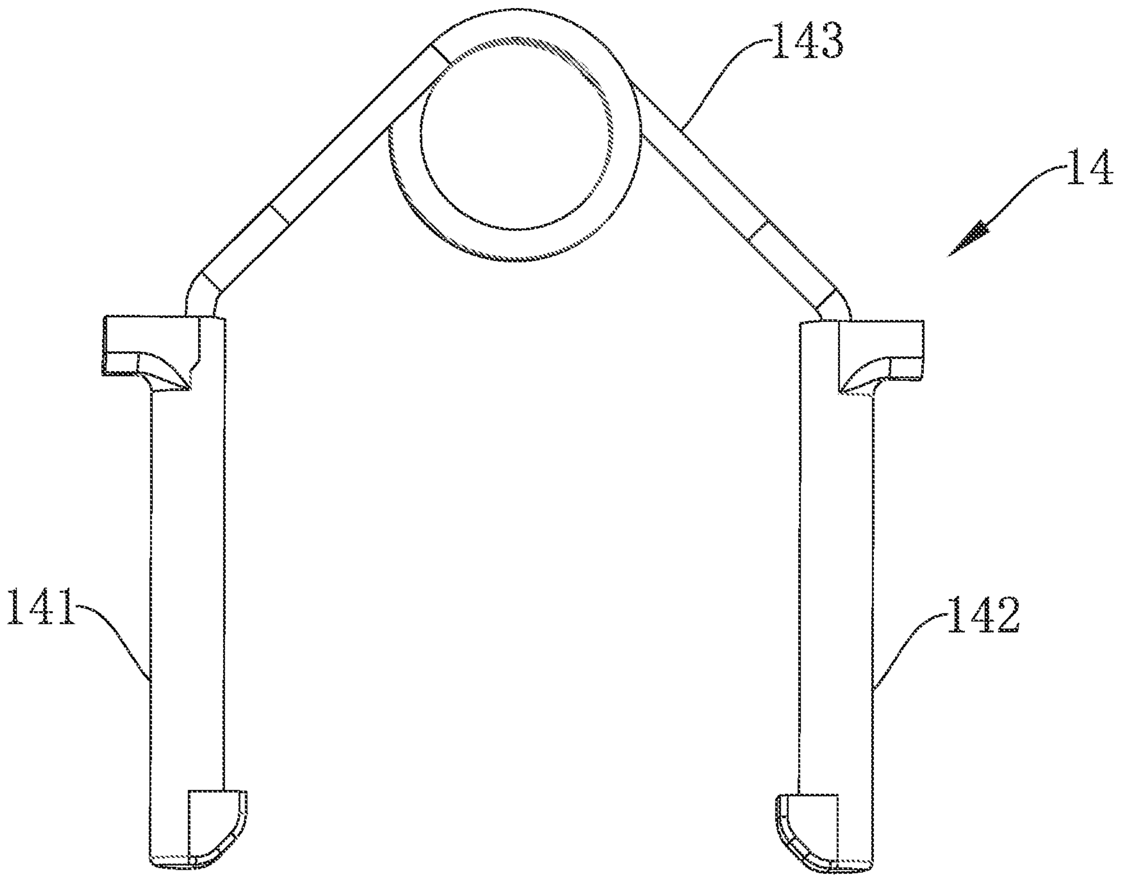
FIG. 8 is a structure diagram of a two-way buckle in a fast plug-in energy storage connector provided by the present disclosure.
Figure 9:
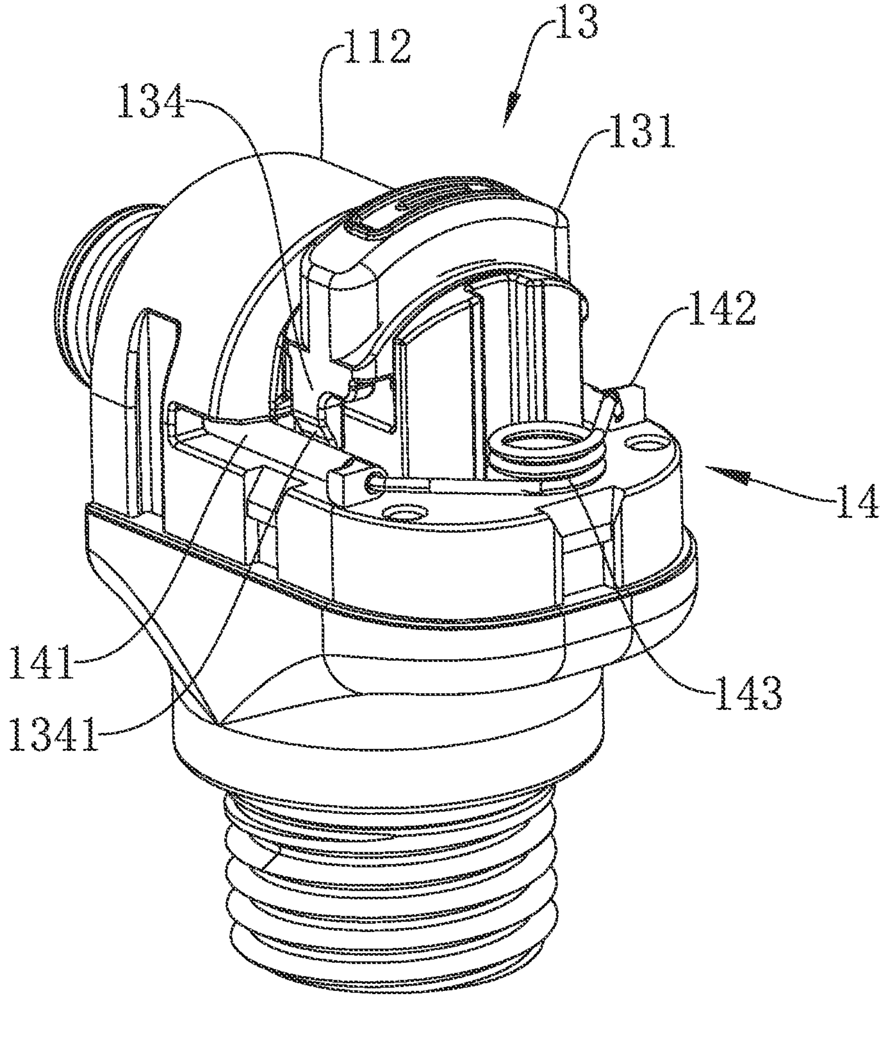
FIG. 9 is a partial-structure diagram of a socket assembly in a fast plug-in energy storage connector provided by the present disclosure.
Figure 10:
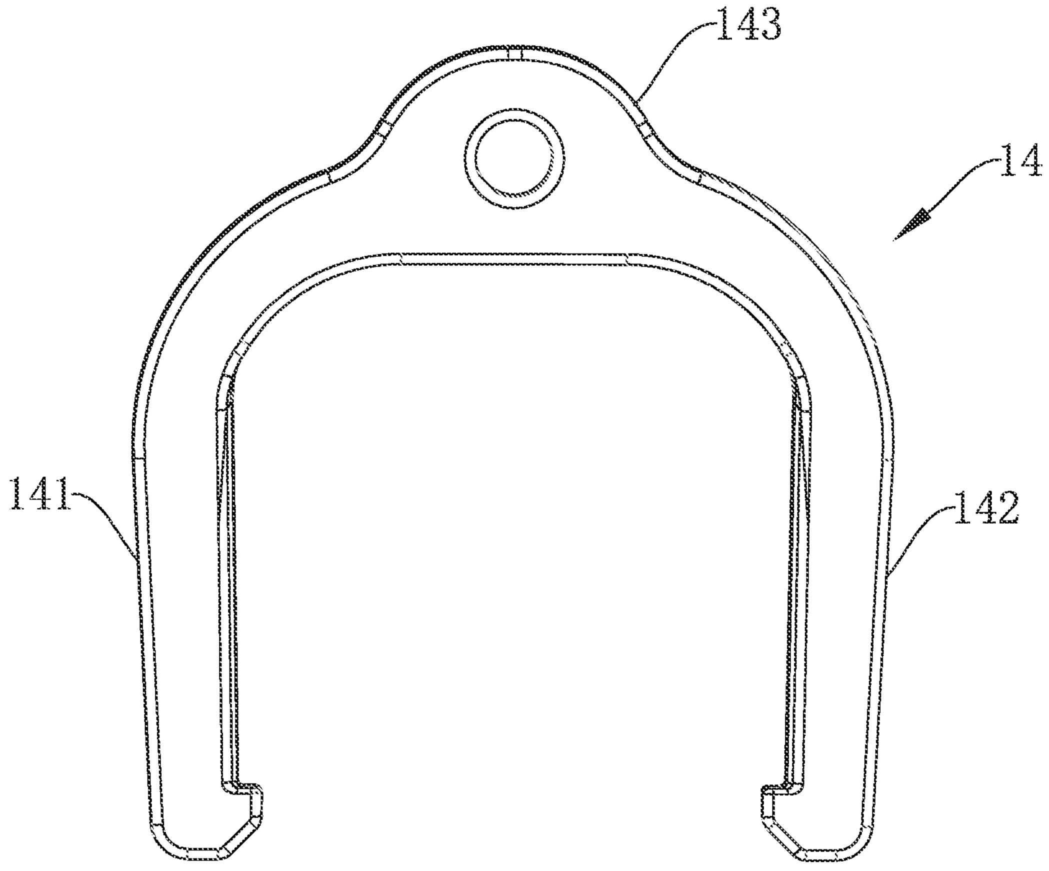
FIG. 10 is a structure diagram of a two-way buckle in a fast plug-in energy storage connector provided by another embodiment of the present disclosure.

Please refer to FIG. 8 and FIG. 9 together, the two-way buckle 14 is installed on the main body portion 112 and includes a first buckle arm 141, a second buckle arm 142 and a connecting member 143. The first buckle arm 141 and the second buckle arm 142 are arranged symmetrically, and one end of the connecting member 143 is connected to the first buckle arm 141 while the other end is connected to the second buckle arm 142. Specifically, both sides of the inner wall of the mounting cavity 1211 are provided with a first clamping hole and a second clamping hole, respectively, and the first buckle arm 141 and the second buckle arm 142 are installed on the main body portion 112 in respective through the first clamping hole and the second clamping hole. The docking portion 212 of the socket assembly 2 is plugged into the mounting cavity 1121 and plugged with the plugging portion 114, and at this time the first buckle arn 141 and the second buckle arm 142 are clamped with the housing body 21. Specifically, the first buckle arm 141 and the second buckle arm 142 are clamped with the annular clamping slot 2141 in respective, such that the plug assembly 1 may achieve 180° of rotation, meet different assembly needs of users and has a strong practicability. The first buckle arm 141 and the second buckle arm 142 are in contact with and leaning against the lean-against portions 1341 of the locking members 134 in the button structure 13 in respective, so as to reduce the risk caused by uneven stress of the button brake block 131 that the button brake block 131 is stuck and does not bounce back, which is convenient for the operator to use, with a long service life. In this embodiment, the first buckle arm 141 and the second buckle arm 142 are both buckling plastic members, the connecting member 143 is a torsional spring, and one end of the torsional spring is connected to the first buckle arm 141 while the other end is connected to the second buckle arm 142. Please refer to FIG. 10 together, in another embodiment, the first buckle arm 141, the second buckle arm 142 and the connecting member 143 may also be set to be integrally formed, which facilitates the assembly of the fast plug-in energy storage connector.

Figure 6:
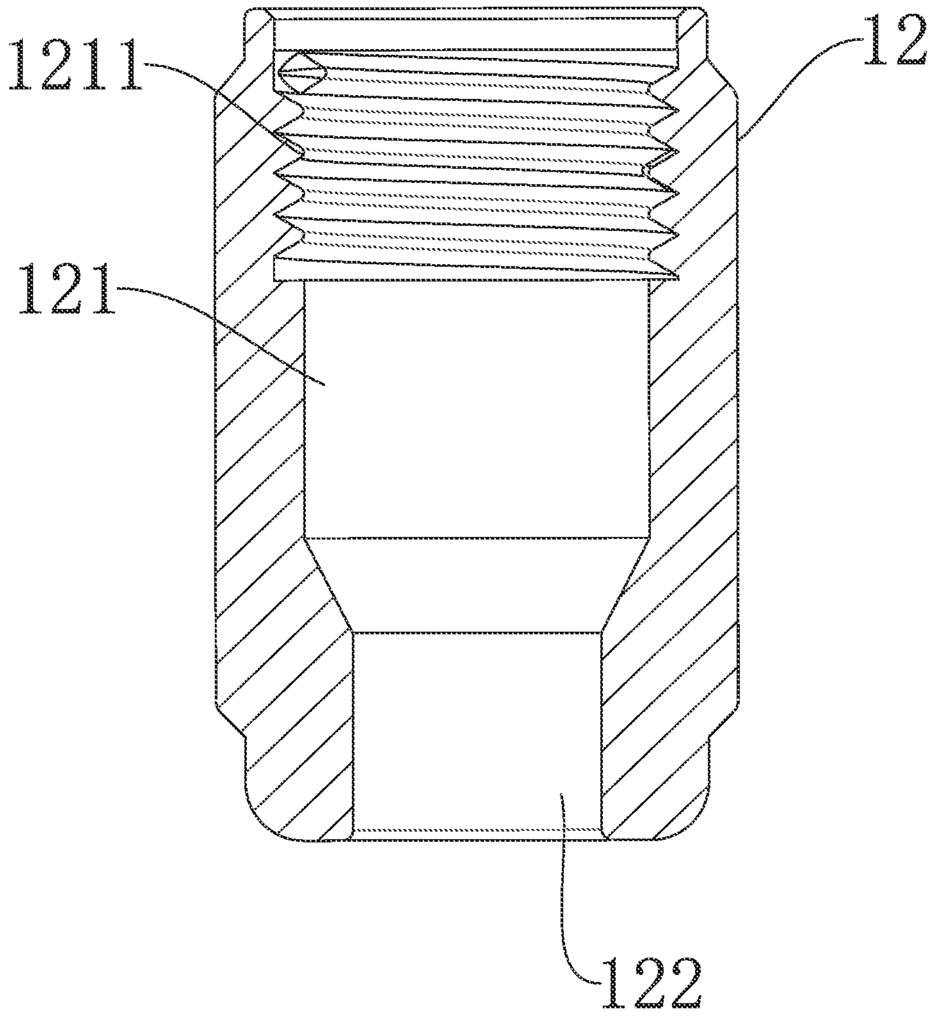
FIG. 6 is a profile diagram of a tail lid in a fast plug-in energy storage connector provided by the present disclosure.

Please refer to FIG. 6 together, a first chamber 121 and a second chamber 122 are sequentially provided inside the tail lid 12 from top to bottom, and the first chamber 121 communicates with the second chamber 122 mutually. An upper end of an inner wall of the first chamber 121 is provided with internal threads 1211, the threaded connection portion 115 of the plug body 11 is in threaded connection with the internal threads 1211, which can ensure the connecting fastness between the plug body 11 and the tail lid 12, and is also convenient for quick installation and disassembly of the operator. An inner diameter of the second chamber 122 is less than that of the first chamber 121, and the second chamber 122 is used to plug the external cable. In this embodiment, the tail lid 12 is a plastic member.

A lower end of the sealing sleeve 17 is clamped in the second chamber 122 of the tail lid 12, and in this embodiment, the sealing sleeve 17 is a silicone member for waterproofing. The tightening jacket 18 is installed in the first chamber 121 and sleeved outside the sealing sleeve 17, such that the sealing sleeve 17 is stably installed in the tail lid 12. The tightening jacket 18 includes a plugging portion 181 and a tightening portion 182, and the plugging portion 181 is in hollow and cylindrical setting for plugging the sealing sleeve 17. The tightening portion 182 is arranged at one end that the plugging portion 181 is close to the second chamber 122 for tightening the sealing sleeve 17, so the tightening portion 182 has better applicability and regulation and is suitable for various cables of different line diameters. Specifically, the tightening portion 182 is composed of a plurality of tightening members, which are all arranged at an edge of one end that the plugging portion 181 is close to the second chamber 122. The plugging portion 181 and the tightening portion 182 are integrally formed.

One end of the conductive terminal 15 is installed in the plugging portion 114 while the other end passes through the threaded connection portion 115 and extends into the tail lid 12. Specifically, the conductive terminal 15 includes a first conductive portion 151, a second conductive portion 152 and a first connecting portion 153, the first conductive portion 151 is arranged in a hollow and tubular structure and installed in the plugging portion 114, and the first conductive portion 151 is in plug-unplug connection with the male terminal 22. The second conductive portion 152 is arranged in a hollow and tubular structure, passes through the threaded connection portion 115 and is plugged into the sealing sleeve 17. One end of the first connecting portion 153 is connected to the first conductive portion 151 while the other end is connected to the second conductive portion 152. The first conductive portion 151, the second conductive portion 152 and the first connecting portion 153 are integrally formed, which is conductive to reducing the contact resistance of the fast plug-in energy storage connector, thereby reducing the generation of heat during use and reducing the temperature when the fast plug-in energy storage connector is used. In this embodiment, the first conductive portion 151, the second conductive portion 152 and the first connecting portion 153 are copper alloy members.

Figure 11:
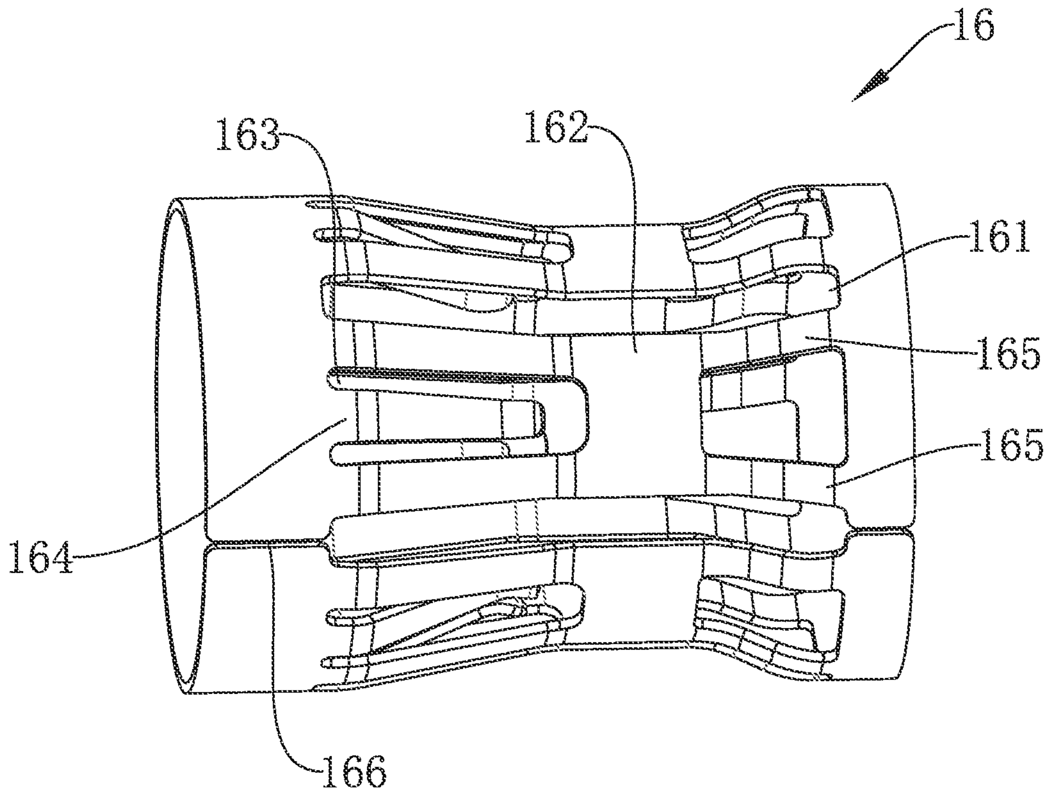

Please refer to FIG. 11 together, the contact cylinder 16 is arranged in a hollow and cylindrical manner, a plurality of first cutting holes 161 formed in the contact cylinder 16, and mounting sheets 162 are arranged in the first cutting holes 161, second cutting holes 163 are formed in the mounting sheets 162, the second cutting holes 163 are close to one end of the opening of the conductive terminal 15, and a dome 164 is installed in the second cutting holes 163. At least one reinforcing member 165 is also installed in the first cutting holes 161, and the reinforcing member 165 is used to connect the mounting sheet 162 to the first cutting holes 161. In this embodiment, two reinforcing members 165 are installed in the first cutting holes 161 and installed on both sides of the mounting sheets 162 in respective for connecting the mounting sheets 162 to the first cutting holes 161. When being plugged with the contact cylinder 16, the male terminal 22 is in elastic contact with the dome 164 first, and then in rigid contact with the mounting sheets 162, which is conducive to improving the positive force when the male terminal 22 is plugged into the contact cylinder 16, thereby reducing a contact resistance.

Preferably, the first cutting holes 161 are uniformly formed in a circumferential direction of the contact cylinder 16, which is conductive to improving the contact performance of the fast plug-in energy storage connector. The first cutting holes 161, the mounting sheets 162 and the reinforcing members 165 are integrally formed, and the second cutting holes 163 and the dome 164 are integrally formed. In this embodiment, the contact cylinder 16 is a copper alloy member. The contact cylinder 16 is formed by winding, and a notch 166 is formed in the contact cylinder 16 and arranged along an axis direction of the contact cylinder 16. The contact cylinder 16 has a certain of elastic deformation quantity in the circumferential direction. Meanwhile, the contact cylinder 16 is also convenient to process, and after being punched, a coiled material is wound and made into the contact cylinder 16, so the manufacturing process is simplified.

When the fast plug-in energy storage connector provided by the present disclosure is assembled, the operator presses the button structure 13, the button brake block 131 moves down, the link 132 slides down in the accommodating cavity, the reset spring 133 is compressed, the locking members 134 move down, the lean-against portions 1341 are separated from the first buckle arm 141 and the second buckle arm 142, and at this time the socket assembly 2 is plugged. After the assembly is completed, the button structure 13 is loosened, under the action of the reset spring 133, the button structure 13 rebounds to an original position, the locking members 134 move up, the lean-against portions 1341 are in contact with and leaning against the first buckle arm 141 and the second buckle arm 142 again in respective, so that the limiting and fixation of the plug assembly 1 and the socket assembly 2 are completed. The assembly method is simple, can complete plugging and assembly quickly, and is convenient for the operator to use. When the plug assembly 1 and the socket assembly 2 need to be disassembled, the operator presses the button structure 13, the button brake block 131 moves down, the link 132 slides down in the accommodating cavity, the reset spring 133 is compressed, the locking members 134 move down, the lean-against portions 1341 are separated from the first buckle arm 141 and the second buckle arm 142, and at this time the socket assembly 2 is unplugged to achieve fast disassembly.

The above embodiments are preferable implementations of the present disclosure, but the implementations of the present disclosure is not limited by the above embodiments. All other changes, modifications, substitutions, combinations and simplifications made without deviating from the spiritual essence and principle of the present disclosure shall be equivalent replacement modes and included in the protection scope of the present disclosure.

What is claimed is:

1. A fast plug-in energy storage connector, comprising a plug assembly (1) and a socket assembly (2) in plug-unplug connection with the plug assembly (1), wherein the socket assembly (2) comprises a housing body (21) and a male terminal (22) installed inside the housing body (21); the plug assembly (1) comprises a plug body (11) in plug-unplug connection with the housing body (21), a tail lid (12) detachably connected to the plug body (11), a button structure (13) movably installed on the plug body (11), a two-way buckle (14) installed in the plug body (11) and a conductive terminal (15) installed in the plug body (11) and in plug-unplug connection with the male terminal (22); the two-way buckle (14) comprises a first buckle arm (141) clamped with the housing body (21), a second buckle arm (142) clamped with the housing body (21) and arranged symmetrically with the first buckle arm (141), and a connecting member (143) for connecting the first buckle arm (141) to the second buckle arm (142); the button structure (13) comprises a button brake block (131) movably installed on the plug body (11), a link (132) installed at a bottom of the button brake block (131), a reset spring (133) sleeved on the link (131) and locking members (134) installed on both sides of the bottom of the button brake block (131) in respective; and lower ends of the locking members (134) are provided with lean-against portions (1341) that are in contact with and leaning against the first buckle arm (141) and the second buckle arm (142) in respective.

2. The fast plug-in energy storage connector according to claim 1, wherein the plug assembly (1) further comprises a contact cylinder (16) installed in the conductive terminal (15) and in plug-unplug connection with the male terminal (22); the contact cylinder (16) is arranged in a hollow and cylindrical manner, a plurality of first cutting holes (161) formed in the contact cylinder (16), and mounting sheets (162) are arranged in the first cutting holes (161); one end that each mounting sheet (162) is close to an opening of the conductive terminal (15) is provided with a second cutting hole (163), and a dome (164) is installed in the second cutting hole (163); and at least one reinforcing member (165) for connecting the mounting sheets (162) to the first cutting holes (161) is also installed in the first cutting holes (161).

3. The fast plug-in energy storage connector according to claim 2, wherein the first cutting holes (161) are uniformly formed in a circumferential direction of the contact cylinder (16).

4. The fast plug-in energy storage connector according to claim 2, wherein the first cutting holes (161), the mounting sheets (162) and the reinforcing members (165) are integrally formed, and the second cutting holes (163) and the dome (164) are integrally formed.

5. The fast plug-in energy storage connector according to claim 2, wherein the contact cylinder (16) is formed by winding; and a notch (166) is formed in the contact cylinder (16) and arranged along an axis direction of the contact cylinder (16).

6. The fast plug-in energy storage connector according to claim 1, wherein the housing body (21) of the socket assembly (2) comprises a base (211), a docking portion (212) installed on one side that the base (211) is close to the plug assembly (1) and connected to the plug assembly (1), a fixing portion (213) installed on one side that the base (211) is away from the plug assembly (1), and a snap ring portion (214) installed at one end that the docking portion (212) is close to the plug assembly (1); one end that the snap ring portion (214) is close to the base (211) is provided with an annular clamping slot (2141); and the first buckle arm (141) and the second buckle arm (142) are clamped with the annular clamping slot (2141) in respective.

7. The fast plug-in energy storage connector according to claim 6, wherein the first buckle arm (141) and the second buckle arm (142) are integrally formed with the connecting member (143).

8. The fast plug-in energy storage connector according to claim 6, wherein the plug body (11) of the plug assembly (1) comprises a main body portion (112) provided with a mounting cavity (1121) for plugging the docking portion (212), a plug upper lid (113) covered at a top of the main body portion (112), a plugging portion (114) installed in the mounting cavity (1121) and in plug-unplug connection with the docking portion (212), and a threaded connection portion (115) installed at a bottom of the main body portion (112); an upper end of an inner wall of the tail lid (12) is provided with internal threads (1211), and the threaded connection portion (115) is in threaded connection with the internal threads (1211); and both sides of an inner wall of the mounting cavity (1211) are provided with a first clamping hole and a second clamping hole, respectively; the first buckle arm (141) and the second buckle arm (142) are installed on the main body portion (112) in respective through the first clamping hole and the second clamping hole; and one end of the conductive terminal (15) is installed in the plugging portion (114) while the other end passes through the threaded connection portion (115) and extends into the tail lid (12).

9. The fast plug-in energy storage connector according to claim 8, wherein a fixing slot (1122) is formed in a top of the main body portion (112), and an accommodating cavity is formed in a bottom of the fixing slot (1122); a mounting hole (1131) corresponding to the fixing slot (1122) is formed in the plug upper lid (113); and the button structure (13) is installed in the fixing slot (1122) through the mounting hole (1131), the link (132) of the button structure (13) is slidingly installed in the accommodating cavity, and one end of the reset spring (133) of the button structure (13) is propped to a bottom of the button brake block (131) while the other end is propped to the bottom of the fixing slot (1122).

10. The fast plug-in energy storage connector according to claim 9, wherein an outer surface of the plug upper lid (113) is provided with a plurality of anti-skid raised lines (1132).

11. The fast plug-in energy storage connector according to claim 9, wherein an upper surface of the button brake block (131) is also provided with a plurality of raised button lines (1311).

12. The fast plug-in energy storage connector according to claim 8, wherein a first sealing ring (116) for waterproofing is sleeved at one end that the threaded connection portion (115) is close to the main body portion (112).

13. The fast plug-in energy storage connector according to claim 8, wherein a first chamber (121), and a second chamber (122) in which an external cable is plugged are sequentially arranged inside the tail lid (12) from top to bottom; the first chamber (121) communicates with the second chamber (122) mutually, and an inner diameter of the second chamber (122) is less than that of the first chamber (121); and the internal threads (1211) are arranged at an upper end of an inner wall of the first chamber (121); and the plug assembly (1) further comprises a sealing sleeve (17) installed in the tail lid (12), and a lower end of the sealing sleeve (17) is clamped in the second chamber (122); and the conductive terminal (15) comprises a first conductive portion (151) installed in the plugging portion (114) and in plug-unplug connection with the male terminal (22), a second conductive portion (152) passing through the threaded connection portion (115) and plugged in the sealing sleeve (17), and a first connecting portion (153) for connecting the first conductive portion (151) to the second conductive portion (152).

14. The fast plug-in energy storage connector according to claim 13, wherein the first conductive portion (151) and the second conductive portion (152) are integrally formed with the first connecting portion (153).

15. The fast plug-in energy storage connector according to claim 13, wherein the plug assembly (1) further comprises a tightening jacket (18) installed in the tail lid (12), and the tightening jacket (18) is sleeved outside the sealing sleeve (17) and installed in the first chamber (121); and the tightening jacket (18) comprises a plugging portion (181) in which the sealing sleeve (17) is plugged, and a tightening portion (182) arranged at one end that the plugging portion (181) is close to the second chamber (122) and used for tightening the sealing sleeve (17).

16. The fast plug-in energy storage connector according to claim 15, wherein the tightening portion (182) is composed of a plurality of tightening members arranged at an edge of one end that the plugging portion (181) is close to the second chamber (122).

17. The fast plug-in energy storage connector according to claim 8, wherein the plugging portion (114) is provided with a mounting slot (1141), on which a second sealing ring (117) for waterproofing is sleeved.

18. The fast plug-in energy storage connector according to claim 6, wherein the socket assembly (2) further comprises an anti-contact member (23) installed at one end that the male terminal (22) is close to the plug assembly (1).

19. The fast plug-in energy storage connector according to claim 18, wherein the socket assembly (2) further comprises a sealing gasket (24) sleeved on one side that the base (211) is close to the fixing portion (213); a plurality of first assembly holes are formed in the base (211), and a plurality of second assembly holes corresponding to the first assembly holes one by one are formed in the sealing gasket (24); and the sealing gasket (24) adopts a fastener to be tightly connected to the base (211) through the first assembly holes and the second assembly holes.

20. The fast plug-in energy storage connector according to claim 6, wherein one end that the snap ring portion (214) is away from the annular clamping slot (2141) is provided with a guide cambered surface (2142) coaxially arranged with the snap ring portion (214).

* * * * *